G. S. & G. R. BAKER.
MACHINE FOR COATING BISCUITS AND OTHER ARTICLES WITH ICING OR SIMILAR SUBSTANCE.
APPLICATION FILED MAY 25, 1915.
1,196,068.
Patented Aug. 29, 1916.
3 SHEETS—SHEET 1.
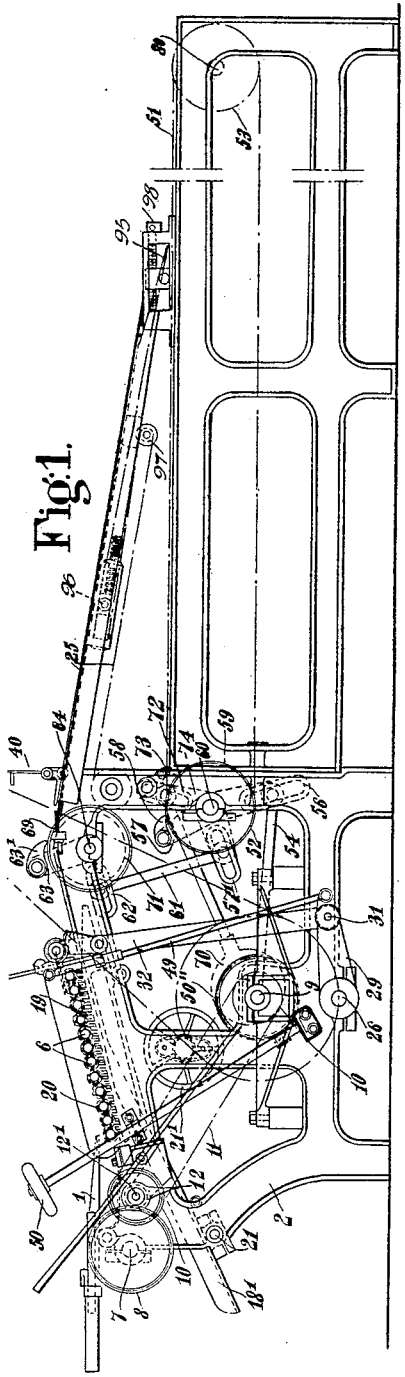
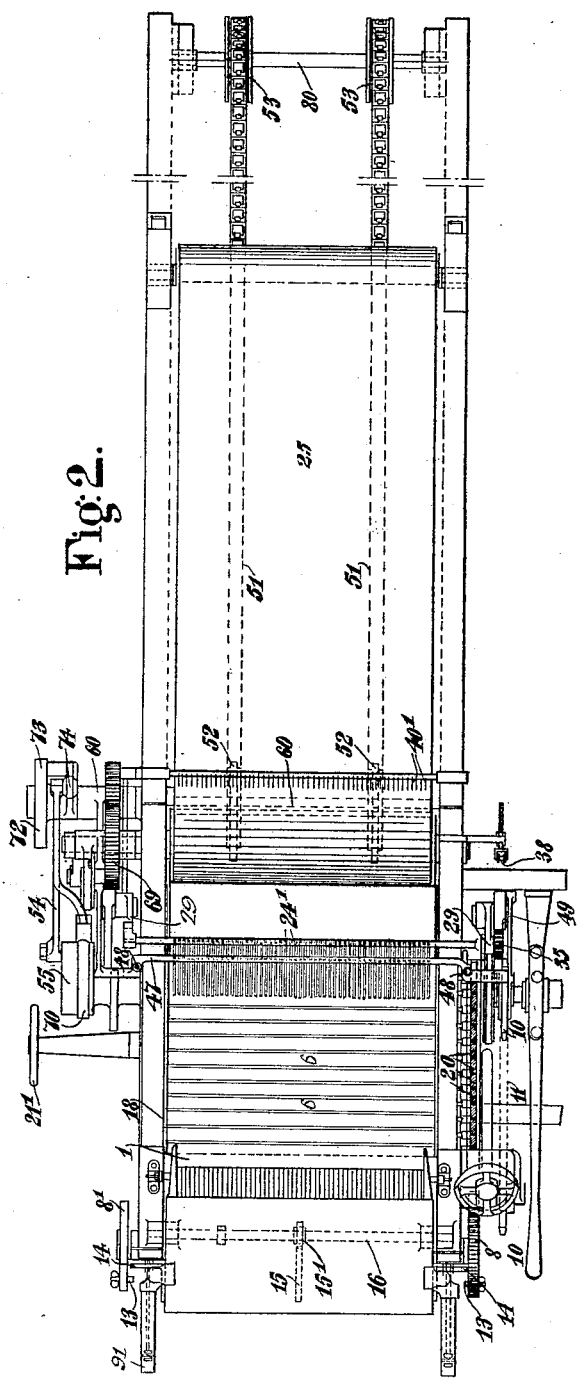
Witnesses.
Inventors:
George Samuel Baker
George Ralph Baker.
by their Attorney

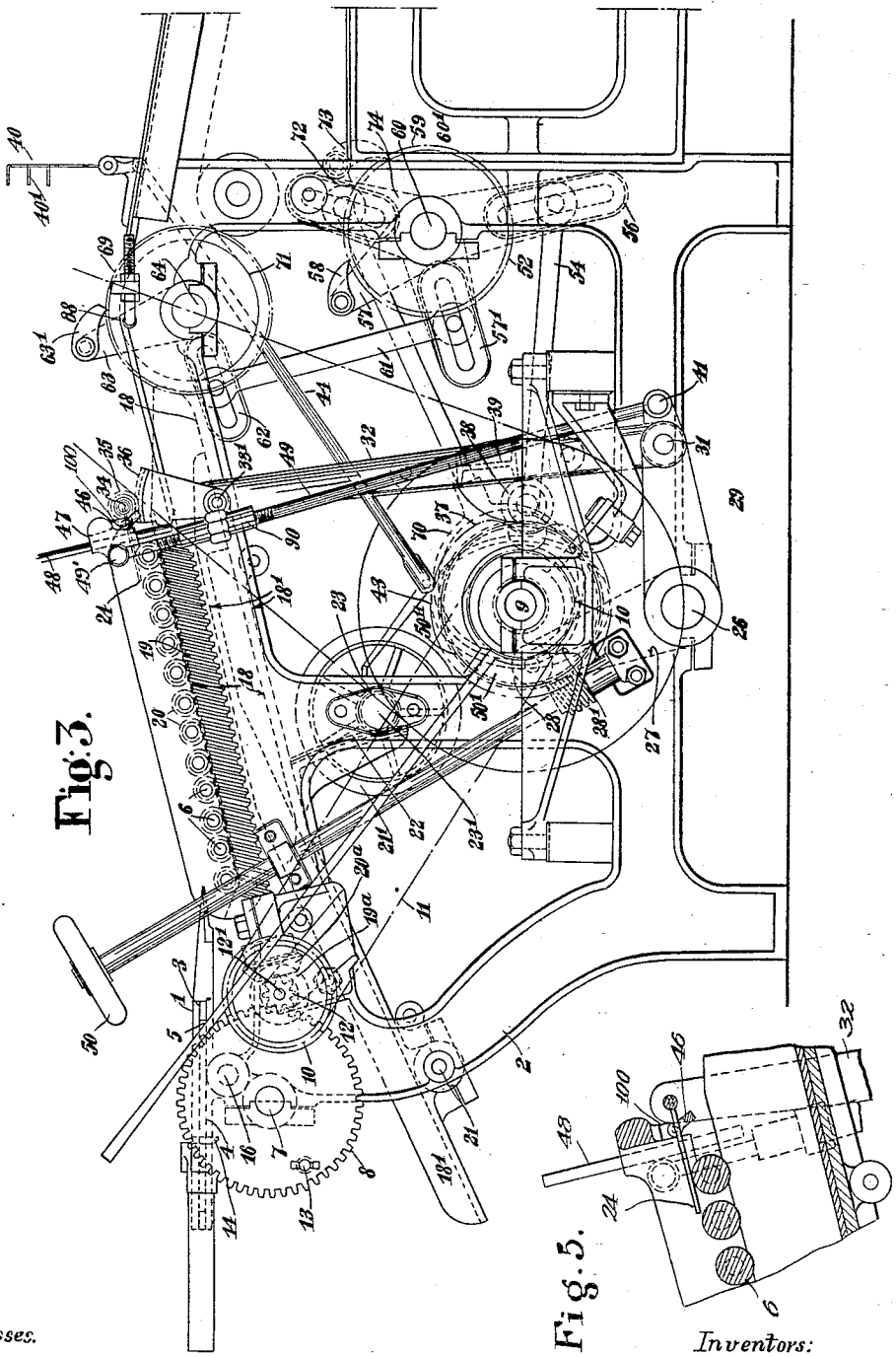

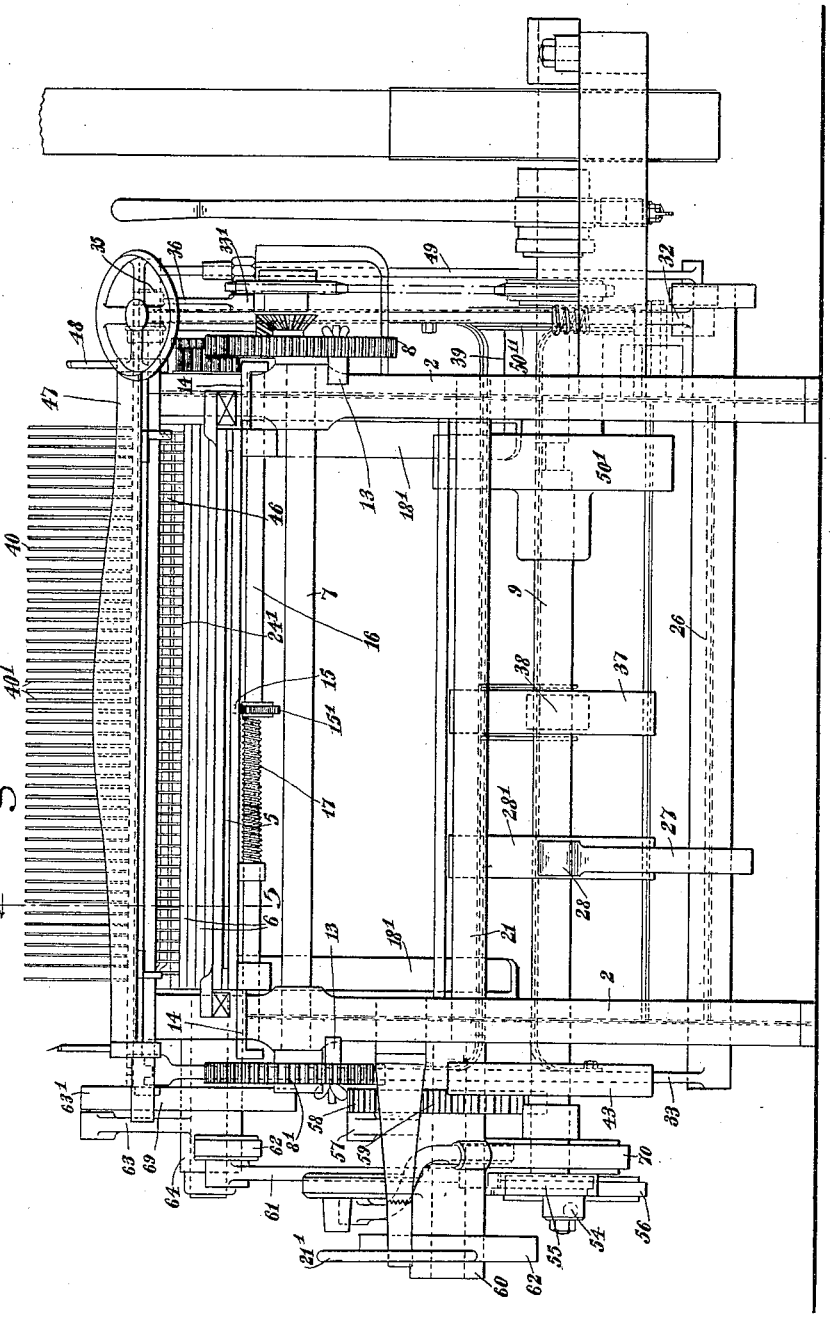

UNITED STATES PATENT OFFICE.

GEORGE SAMUEL BAKER AND GEORGE RALPH BAKER, OF LONDON, ENGLAND.

MACHINE FOR COATING BISCUITS AND OTHER ARTICLES WITH ICING OR SIMILAR SUBSTANCE.

1,196,068.   Specification of Letters Patent.   Patented Aug. 29, 1916.

Application filed May 25, 1915. Serial No. 30,417.

*To all whom it may concern:*

Be it known that we, GEORGE SAMUEL BAKER and GEORGE RALPH BAKER, subjects of the King of England, both residing at London, N. W., in England, have invented certain new and useful Improvements in Machines for Coating Biscuits and Other Articles with Icing or Similar Substance, of which the following is a specification.

The object of this invention is to provide an improved machine for coating biscuits, confectionery or the like with icing or similar substance, and the invention consists broadly in feeding the articles to be coated onto a series of rollers immersed in the coating material, these rollers being rotated so as to take up and convey the coating material to one side of the articles while feeding the latter forward. The broad use of rollers for coating confectionery and conveying forward the articles to be coated, is not in itself novel, but heretofore their use has been proposed in connection with confectionery coating machines in which the coating material is poured onto the articles from above, whereby the whole surface of the article is coated.

According to the present invention the rollers are immersed in the coating material which is contained in a receptacle so that only one face of the articles is coated, and the container with the rollers therein is preferably arranged at an inclination so that the coating material returns by gravity from the rollers at the discharge end of the receptacle to those at the feeding-in end.

The invention also comprises details of construction and arrangement of parts as hereinafter described and pointed out in the appended claims.

An embodiment of the invention is illustrated in the accompanying drawings, in which:—

Figure 1 is a side elevation of the entire machine, Fig. 2 is a plan view thereof. Fig. 3 is a similar view to Fig. 1, but to a larger scale, the delivery end of the machine not being shown, and Fig. 4 is an end elevation of the machine looking from left to right. Fig. 5 is a section on the line 5—5 of Fig. 4 to a larger scale.

Referring to the drawings, 1 is the feed table which is carried by the frame 2 of the machine and comprises a top plate 3 and bottom plate 4, between which plates is slidably mounted a reciprocating pusher plate 5, which is adapted, during its forward movement, to push the articles placed by the operator on the forward end of the feed table onto a series of rollers 6.

The means for reciprocating the pusher plate 5 comprises a shaft 7, carried by the machine frame underneath the feed table and having fixed thereto a toothed wheel 8, which latter is located at the side of the feed table and is driven off the main shaft 9 of the machine as by chain wheels 10, chain 11 and pinion 12. Fixed to the side of the toothed wheel 8, and to the pinion $8^1$ on the other end of the shaft 7, are projections 13, which during the rotation of the gears 8, $8^1$ engage abutments 14 on the sides of the pusher plate, whereby the latter is fed forward until the projections 13 leave the abutments.

For the purpose of returning the pusher plate 5 to its rearward position it is provided on its underside with a rack 15 with which meshes a pinion $15^1$ on a shaft 16, which latter is carried by the frame 2 of the machine and has coiled thereon a spring 17, one end of the latter being secured to the shaft and the other end to the pinion $15^1$. During the feeding movement of the pusher-plate and consequent rotation of pinion $15^1$ by rack 15, the spring 17 is wound up so that it rotates pinion 15 and thereby returns the pusher-plate to its original position when the projections 13 clear the abutments 14.

A buffer-device, preferably pneumatic, is provided to cushion the final stage of rearward movement of the pusher-plate, and said cushioning device may comprise a cylinder 91 fixed to any convenient support and containing a plunger connected to the pusher-plate.

The articles to be coated with the coating material—the latter and the articles being referred to hereinafter as icing and biscuits respectively—are as previously described pushed by the pusher-plate onto a series of rollers 6 which transfer to the undersides of the biscuits the icing in a container 18. As shown in the drawings, the icing container 18 and rollers 6 are preferably carried in an inclined position so that the icing material carried up to the upper rollers has the tendency to return by gravity to the lower end of the container 18 to feed the rollers at the lower level. The rollers 6 are all rotated in the same direction by means of a screw 19 meshing with toothed wheels 20 on the ends of the rollers 6. The screw 19 is carried outside the container 18 by the machine frame and is driven off the shaft $12^1$ on which gear 12 is fixed by bevel gearing $19^a$, $20^a$.

It has been found in practice, by immersing the rollers in a mass of coating material as described, that the peripheral speed of the rollers is greater than the forward speed of the coating material and this, combined with the wavy movement of said material traveling over the rollers, produces a kind of scraping action on the lower surface of the biscuits which effectually fills with said coating material all air holes which may exist in this surface.

The icing container 18 is carried by a frame $18^1$, which, for the purpose of enabling the container to be removed and inserted, is pivoted at 21 to the frame 2 of the machine and is provided on its underside with a depending rack 22 with which meshes a pinion 23 fixed to shaft $23^1$ of hand wheel $21^1$. By turning the hand wheel $21^1$ it will be seen that the icing container can be swung up and down about its shaft 21 and thereby adjusted to the desired position.

As the coated biscuits arrive at the delivery end of the rollers 6 a rocking fork 24 engages under them and conveys them from the rollers to a delivery means such as a discharge web 25, the fork with the biscuits thereon being raised at the commencement of its movement, then rocked toward the discharge web 25 and finally reversed so as to deposit the biscuits with their coated sides upward. These movements are imparted to the fork 24 by the following means: Fixed to a shaft 26 extending across the machine is an arm 27, which by means of its roller 28, coöperates with a cam $28^1$ on the main shaft 9. Fixed to the ends of the shaft 26 are arms 29, 30 to which are pivotally connected at 31 levers 32, 33, the latter being connected to each other at their upper ends by a cross shaft 34 which carries the fork 24 and a pinion 35, the latter meshing with a toothed quadrant 36 pivoted at $33^1$ to the lever 32. The levers 32, 33 are rocked about their pivot 31 by means of a cam 37 coöperating with a roller 38 fixed to a member 39 connecting the levers 32, 33. It will thus be seen that upon rotation of the shaft 9, the levers 32, 33 and consequently the fork 24 will be raised by means of cam $28^1$ and arms 27, 29, and the levers 32, 33 and fork 24 will be swung about the pivot 31 toward the discharge web 25 by cam 37. During the latter stages of movement of levers 32, 33 the rack 36 strikes an adjustable abutment 88 fixed to the machine frame, whereby the rack is turned about its pivot, so that the fork is turned by pinion 35 to deposit the biscuits with their iced sides upward on the web 25. The levers 32, 33 are returned to their original positions by a spring (not shown) and the pinion 35 is likewise caused to rotate under the influence of a spring to return the fork to its original position on the rollers 6.

In order to insure detachment of the biscuits from the fork 24 when the latter has been reversed to deposit the biscuits on web 25, there is arranged above the latter a comb 40 comprising a series of fingers $40^1$ carried by a shaft 42 which latter is rocked downward toward the fork 24 so that the fingers $40^1$ engage between the fingers $24^1$ of fork 24 and thereby detach the biscuits. This rocking movement of shaft 42 is effected by a cam 43 on shaft 9 operating a link 44 which is connected at its raised end to the shaft 42 by means of an arm 45 fixed to said shaft, while the lower end of the link has pivotally connected thereto a rod $44^1$ pivoted at the other end to the frame of the machine.

For the purpose of removing superfluous icing from the coated side of the biscuits and insuring an even layer of icing on the same, there is arranged underneath the fork 24 a scraper bar 46 which is normally clear of the fork and is carried by brackets 100 fixed to a cross head 47 mounted for vertical reciprocating movement on guides 48, said cross head being connected at $49^1$ to the ends of the arms 29, by rods 49. When the fork 24 with the coated biscuits thereon is raised to lift the biscuits off the rollers 6 in the manner hereinbefore described, the scraper is also raised, the points of connections of rods 49 to the arms 29, being so arranged relatively to the points of connections 31 of levers 32, 33 to said arms, that the scraper contacts with the undersides of the fingers of the fork 24 when the latter reaches its highest position. Consequently during the movement of the fork 24 to position the coated biscuits over the web 25, the scraper bar bears against the underside of the fingers $24^1$ of the fork 24 and thus scrapes off superfluous icing. Before the return movement of the fork 24 the scraper is lowered again to allow the fingers $24^1$ to pass during the return of the fork.

The distance of the scraper from the fork member 24 can be adjusted by means of the right and left hand screw adjustment 90 on rods 49.

The web 25 travels around the pulley 71 to the knife edge board 95, thence around the rollers 96, 97 and back to the pulley 71, the knife edge board being carried as usual by guided blocks capable of being adjusted by a set screw 98.

In order to provide compensation for variations in the speed of travel of the biscuits on the coating rollers 6, caused for instance by variations in the consistency of the icing or in the thickness of the layer of icing on the rollers, the cams for operating the delivery member and the gear for driving the feed and coating members are so connected that one of them can be adjusted relatively to the other, so as to enable the arrival of the biscuits at the discharge end of the rollers to be correctly timed with respect to the commencement of the delivery movement of the delivery member. For this purpose there is arranged on the shaft 9, between the chain wheel 10 driving the feed and coating mechanism and the cams 37, 28¹ for operating the delivery mechanism, an epicyclic gear 50¹, through which said cams are driven. This epicyclic gear comprises a sun pinion with planet pinion and stationary toothed ring 50¹¹, and is capable of being manually operated by means of a hand wheel 50 to effect the required change of timing while the machine is in operation, the shaft of the hand-wheel being provided for this purpose with a worm which meshes with the toothed ring 50¹¹. Obviously the epicyclic gear could be arranged so that its adjustment would alter the timing of the feeding and coating mechanism instead of the delivery mechanism.

In the machine shown the biscuits are discharged from the web 25 onto pans on the discharge chains 51 carried by chain wheels 52, 53, on shafts 60 and 80 respectively. The necessary movement is imparted to the sprockets 52 by known pawl-and-ratchet mechanism, such mechanism comprising a rod 54 connected at one end to a crank disk 55 on shaft 9, and at its other end to the arm 56 of a ratchet lever 57, the latter carrying a pawl 58 engaging a ratchet wheel 59 on shaft 60 on which chain wheels 52 are fixed.

The movements of ratchet lever 57 are imparted to the pulley 71 of web 25 by means of a link 61 connected at one end to the arm 57¹ of lever 57 and at the other end to the arm 62 of lever 63, the pawl 63¹ of which operates a ratchet wheel 69 on shaft 64.

Mounted on the shaft 60 adjacent ratchet wheel 59 is a skip ratchet 72 which is operated by a pawl 73 carried by arm 74, the latter being operated by an eccentric 70 on shaft 9.

What we claim as our invention and desire to secure by Letters Patent of the United States is:—

1. In a machine of the character described, the combination of a receptacle adapted to receive coating material in bulk, a series of rollers within said receptacle positioned to be immersed in said coating material and to receive the goods to be coated on one side only, and means for rotating said rollers to feed the articles and coating material from one end of said receptacle to the other.

2. In a machine of the character described, the combination of a receptacle adapted to receive coating material in bulk, a series of rollers within said receptacle positioned to be immersed in said coating material and to receive the goods to be coated on one side only, and means for rotating said rollers to feed the articles and coating material from one end of said receptacle to the other, said receptacle being inclined downward toward the feed end of said rollers whereby the coating material is caused to return by gravity to said feed end.

3. In a machine of the character described, the combination of a receptacle adapted to receive coating material in bulk, a series of rollers within said receptacle positioned to be immersed in said coating material and to receive the goods to be coated on one side only, means for rotating said rollers to feed the articles and coating material from one end of said receptacle to the other, a pivoted support for said receptacle, and means for angularly adjusting said support about its pivot.

4. In a machine of the character described, the combination of a receptacle adapted to receive coating material in bulk, a series of rollers within said receptacle positioned to be immersed in said coating material and to receive the goods to be coated on one side only, means for rotating said rollers to feed the articles and coating material from one end of said receptacle to the other, a reversible oscillatory delivery device positioned at the discharge end of the receptacle to engage under the articles on the rollers and convey them to a receiving member coated side upward, and an oscillatory comb member coöperating with said discharge member for positively detaching the coated articles therefrom.

5. In a machine of the character described, the combination of a receptacle adapted to receive coating material in bulk, a series of rollers within said receptacle positioned to be immersed in said coating material and to receive the goods to be coated on one side only, means for rotating said rollers to feed the articles and coating material from one end of said receptacle to the other, a reciprocatory member adapted to feed the articles to be coated to said rollers, spring means adapted to effect the return movement of said feed member and buffer means for cushioning said return movement.

6. In a machine of the character described, the combination of a receptacle adapted to receive coating material in bulk, a series of rollers within said receptacle positioned to be immersed in said coating material and to receive the goods to be coated on one side only, means for rotating said rollers to feed the articles and coating material from one end of the receptacle to the other, a reciprocatory device adapted to feed the articles to be coated to said rollers, a reversible oscillatory delivery device at the discharge end of the receptacle to engage under the coated articles and convey them to a receiving member, and means for timing the relative periods of operation of said feeding and delivery devices.

7. In a machine of the character described, the combination of a receptacle adapted to receive coating material in bulk, a plurality of rollers within said receptacle positioned to be immersed in said coating material and receive the goods to be coated on one side only, means for rotating said rollers to feed the articles and coating material from one end of the receptacle to the other, said receptacle being inclined downward toward the feed end of said rollers, a reciprocatory device adapted to feed the articles to be coated to said rollers, spring means adapted to effect the return movement of said feed member, buffer means for cushioning said return movement, a pivoted support for said receptacle, means for angularly adjusting said support about its pivot, a reversible oscillatory delivery device at the discharge end of the receptacle adapted to engage under the articles on the rollers and convey them to a receiving member coated side upward, means coöperating with said delivery device for removing superfluous coating material from the articles, an oscillatory comb member coöperating with said discharge device to positively detach the coated articles therefrom, and means for adjusting the relative periods of operation of said feed and delivery devices and the roller rotating means.

In witness whereof we have signed this specification in the presence of two witnesses.

GEORGE SAMUEL BAKER.
GEORGE RALPH BAKER.

Witnesses:
H. D. JAMESON,
O. J. WORTH.

Copies of this patent may be obtained for five cents each, by addressing the "Commissioner of Patents, Washington, D. C."